(12) United States Patent
Aranda Vazquez et al.

(10) Patent No.: US 10,813,176 B2
(45) Date of Patent: Oct. 20, 2020

(54) COOK TOP HAVING AT LEAST ONE COOKING ZONE AND METHOD FOR OPERATING A COOK TOP

(71) Applicants: Sandra Aranda Vazquez, Saragossa (ES); Ignacio Garde Aranda, Saragossa (ES); Oscar Gracia Campos, Saragossa (ES); Sergio Llorente Gil, Saragossa (ES); Oscar Lucia Gil, Saragossa (ES); Carlos Vicente Mairal Serrano, Saragossa (ES); Ignacio Millan Serrano, Saragossa (ES); Paul Muresan, La Cartuja (ES)

(72) Inventors: Sandra Aranda Vazquez, Saragossa (ES); Ignacio Garde Aranda, Saragossa (ES); Oscar Gracia Campos, Saragossa (ES); Sergio Llorente Gil, Saragossa (ES); Oscar Lucia Gil, Saragossa (ES); Carlos Vicente Mairal Serrano, Saragossa (ES); Ignacio Millan Serrano, Saragossa (ES); Paul Muresan, La Cartuja (ES)

(73) Assignee: BSH Hausgeräte GmbH, Munich (DE)

( * ) Notice: Subject to any disclaimer, the term of this patent is extended or adjusted under 35 U.S.C. 154(b) by 532 days.

(21) Appl. No.: 15/832,797

(22) Filed: Dec. 6, 2017

(65) Prior Publication Data
US 2018/0098387 A1    Apr. 5, 2018

Related U.S. Application Data

(62) Division of application No. 13/581,652, filed as application No. PCT/EP2011/051808 on Feb. 8, 2011, now Pat. No. 9,867,235.

(30) Foreign Application Priority Data

Mar. 3, 2010  (ES) .................................. 201030315

(51) Int. Cl.
    *H05B 6/06*   (2006.01)
    *H05B 6/12*   (2006.01)

(52) U.S. Cl.
    CPC ............. *H05B 6/062* (2013.01); *H05B 6/065* (2013.01); *H05B 6/1272* (2013.01); *H05B 2213/05* (2013.01); *Y02B 40/126* (2013.01)

(58) Field of Classification Search
    CPC ...... H05B 6/00; H05B 6/1209; H05B 6/1272; H05B 6/065; H05B 6/062; H05B 2213/05; Y02B 40/126
    (Continued)

(56) References Cited

U.S. PATENT DOCUMENTS 8,742,299 B2    6/2014  Gouardo et al.
2005/0109770 A1  5/2005  Esteras Duce et al.
(Continued)

FOREIGN PATENT DOCUMENTS

DE   102006054973 A1 *  5/2008   ........... H05B 6/1272
EP       0619693 A2    10/1994
(Continued)

OTHER PUBLICATIONS

International Search Report PCT/EP2011/051808.
(Continued)

*Primary Examiner* — Dana Ross
*Assistant Examiner* — Kuangyue Chen
(74) *Attorney, Agent, or Firm* — Michael E. Tschupp; Andre Pallapies; Brandon G. Braun

(57) ABSTRACT

In a method for operating a cooking zone of a cook top, wherein the cooking zone is formed by at least two cooking
(Continued)

sub-zones and each cooking sub-zone can be heated by at least one heating unit, with the heating units arranged adjacent to each other without overlapping such that a cohesive heatable surface is formed during a joint operation of the cooking sub-zones, detection of an occupancy of a cooking sub-zone by at least one food preparation vessel is activated in a first operating mode and a same electrical power is supplied to all activated cooking sub-zones occupied by a food preparation vessel.

14 Claims, 1 Drawing Sheet

(58) Field of Classification Search
USPC .................................. 219/447.1, 620, 626
See application file for complete search history.

(56) References Cited

U.S. PATENT DOCUMENTS

| | | | |
|---|---|---|---|
| 2007/0164017 A1* | 7/2007 | Gouardo | H05B 6/065 219/626 |
| 2008/0164249 A1 | 7/2008 | Gil | |
| 2008/0173632 A1* | 7/2008 | Jang | H05B 3/746 219/432 |
| 2009/0139986 A1* | 6/2009 | Lee | H05B 1/0266 219/622 |
| 2010/0018961 A1* | 1/2010 | Roh | F24C 15/102 219/447.1 |
| 2010/0282740 A1* | 11/2010 | Artigas Maestre | H05B 6/065 219/662 |
| 2012/0318786 A1* | 12/2012 | Casanova Lacueva | H05B 6/062 219/626 |
| 2012/0321761 A1* | 12/2012 | De la Cuerda Ortin | H05B 6/062 426/231 |
| 2012/0321762 A1* | 12/2012 | Aranda Vazquez | H05B 6/1272 426/231 |

FOREIGN PATENT DOCUMENTS

| | | |
|---|---|---|
| EP | 1768258 A2 | 3/2007 |
| WO | 2008058614 A1 | 5/2008 |

OTHER PUBLICATIONS

Report of Examination including National Search Report CN 2011800120597 dated Mar. 3, 2014.
Report of Examination EP 11 703 659.0 dated Aug. 7, 2015.

\* cited by examiner

COOK TOP HAVING AT LEAST ONE COOKING ZONE AND METHOD FOR OPERATING A COOK TOP

CROSS-REFERENCE TO RELATED APPLICATIONS

This application is a Divisional, under 35 U.S.C. § 121, of U.S. application Ser. No. 13/581,652, filed Sep. 5, 2012, which is a U.S. national stage application under 35 U.S.C. § 371 of PCT/EP2011/051808, filed Feb. 8, 2011, which designated the United States; this application also claims the priority, under 35 U.S.C. § 119, to Spanish Application No. P201030315, filed Mar. 3, 2010.

BACKGROUND OF THE INVENTION

The invention relates to a cooktop having at least one cooking zone and to an apparatus for detecting a food preparation vessel on the cooking zone. The invention also relates to a method for operating a cooktop.

Cooktops which have a number of cooking zones are known from the prior art. Considered in isolation, each cooking zone is heated by a heating element which is disposed below a support plate of the cooktop, on which food preparation vessels can be placed. In this context cooktops are known in which a cooking zone is able to be heated by a number of heating units running within one another, which are configured for example as circular heating elements or induction coils. This enables the cooking zone to be heated over an individual surface with heating elements configured within one another and with a different radius.

The detection of the space occupied by a pot is significant precisely with regard to the individual activation and deactivation of these types of separate heating units. It enables the position and size of the surface covered by a food preparation vessel when placed on the support plate to be detected.

A circuit arrangement for evaluating a sensor state is known from EP 1 768 258 A2, by means of which a corresponding positioning of a pot on a cooktop is able to be detected.

The known cooking zones of a cooktop are restricted in respect of their size and in addition are functionally restricted in respect of the arrangement of the heating units as well as their individual mode of operation.

A heating facility for an induction cooker is known from WO 2006/092179 A1. It comprises a circuit arrangement with a number of inductors which can be connected to each other in different ways. The heating facility has at least a first resonant circuit for this purpose which comprises at least a first and a second inductor for transmission of heat energy to an element to be heated and a first circuit for exciting the first resonant circuit and for supplying the heat energy to the inductors. Furthermore the heating facility has a switching means, by means of which the heat energy is optionally able to be supplied to just one of the inductors or simultaneously to both inductors in a parallel circuit.

BRIEF SUMMARY OF THE INVENTION

The object of the present invention is to create an induction cooktop as well as a method for operating such an induction cooktop by means of which a cooking zone configured as a large surface can be operated in an energy-efficient manner and the pots can occupy the space in an improved manner.

With an inventive method for operating a cooking zone of a cooktop, in which the cooking zone is formed from at least two cooking sub-zones and each cooking sub-zone is able to be heated by way of at least one heating unit, the heating units are disposed adjacent to one another without overlapping, such that a cohesive heatable surface is formed during joint operation of the cooking sub-zones. In the first operating mode, in which the cooking sub-zones can be operated as a joint cooking zone, detection of the occupancy of a cooking sub-zone by at least one food preparation vessel can be performed. In the first operating mode all activated cooking sub-zones occupied by a food preparation vessel are also then only supplied with the same electrical power in each instance. In this quite specific operating mode of the cooktop therefore all the occupied cooking sub-zones are supplied with the same electrical power.

Since the invention preferably covers induction cooktops, the heating units, which comprise inductors, are operated in such a manner that the inductors of the respective cooking sub-zones are excited with the same frequency so that they output the same electrical power.

With regard to the heating of a cooking sub-zone, it should be noted in the case of an induction cooktop that an electromagnetic interaction between the coil of an inductor and the material of the food preparation vessel placed on a cooktop plate produces corresponding heating of the food preparation vessel and therefore also the food introduced therein. Specific heating of the cooktop plate, as occurs with radiant heating elements, does not take place with induction cooktops. In the case of an induction cooktop therefore the formulation relating to the heating of a cooking sub-zone by means of a heating unit should be understood to mean the heating of the food preparation vessel placed on the cooking sub-zone in an inductive manner.

In a second operating mode of the cooktop cooking sub-zones are preferably operated independently of one another as a separate cooking zone in each instance.

An occupancy detection phase is preferably started in a user-defined manner in the first operating mode.

In a first operating mode the cooking sub-zones are preferably operated as a single cooking zone and in the first operating mode detection of the occupancy of a cooking sub-zone by at least one food preparation vessel is performed, with an occupancy detection phase being started in a user-defined manner. This ensures energy-saving operation of the cooking zone. In addition inadvertent heating of objects on the cooking zone can also be avoided.

Preferably with the selection of the first operating mode a first occupancy detection phase is automatically started and only the cooking sub-zone on which a food preparation vessel is detected is heated. This ensures particularly energy-saving operation.

Preferably there is provision, after the first occupancy detection phase has elapsed, for the performance of a subsequent further occupancy detection phase only to be able to be started in a user-defined manner. With food preparation processes already begun, for which the cooktop has already been switched on for quite a long time, this prevents cooking sub-zones, on which no pot or a pot not intended to be heated is present, being activated in an unwanted manner because the user is not paying attention. It is precisely when a food preparation process is already being carried out that a user is generally focused and concentrating on said process and may be distracted so that they also place objects such as a fork or other flatware on the cooktop. Were an automatic occupancy detection then to be carried out and such occupancy detected, this flatware would be heated, which is of course undesirable. This can be avoided by the above-mentioned advantageous embodiment.

Preferably after the end of an occupancy detection phase, placing a further food preparation vessel on the cooking zone is not detected in the first operating mode and the cooking sub-zone on which the further food preparation vessel is placed remains unheated. This also allows the corresponding safety aspects to be satisfied and unwanted heating to be avoided. In addition energy is also saved here, if the user only intends to place the food preparation vessel on the cooktop in order to put it down somewhere without also heating it up straight away.

Preferably during an occupancy detection phase the removal and placing of one or more food preparation vessels on the cooking sub-zones of the cooking zone is detected and the cooking sub-zones on which occupancy is detected are heated. Thus in this period of time during which an occupancy detection is running, food preparation vessels can be additionally put down or removed, which are then also detected as part of the occupancy check.

Preferably an occupancy detection phase lasts less than 10 seconds and amounts particularly to around 5 seconds. This is a time frame which makes possible a safe and precise occupancy detection check and on the other hand however does not last too long, thereby unnecessarily delaying the further actions of the user for starting the food preparation process or continuing a food preparation process. Instead precisely this period of time is matched to the usual user-specific mode of operation and a corresponding sequence of actions of a user. This means that the user is neither put under pressure during operation of the cooktop nor held up in the further mode of operation after such actions.

This creates a very user-friendly mode of operation. Preferably all cooking sub-zones are checked in respect of whether they are occupied or not at least in the first occupancy detection phase, particularly in all occupancy detection phases.

Provision can also be made, in a subsequent second occupancy detection phase, for only the cooking sub-zones which were not occupied during the first occupancy detection phase to be checked in respect of whether they are occupied or not.

Provision is preferably made in the first operating mode for a displacement of a food preparation vessel detected during an occupancy detection phase on the cooking zone also to be detected after an occupancy detection phase has elapsed and the cooking sub-zones to which the food preparation vessel is displaced then to be heated. In particular those cooking sub-zones on which the food preparation vessel was previously standing and which are now no longer occupied are automatically switched off. A certain delay time can be defined for switching off so that if necessary on the space which now becomes free on one or more cooking sub-zones, on which the food preparation vessel previously stood and then no longer stands after being displaced, this cooking sub-zone continues to be operated by a further food preparation vessel being placed on it.

Preferably this type of delay period can last a few seconds, particularly less than ten seconds, preferably around five seconds.

It is particularly advantageous for the first operating mode only to be started in a user-defined manner. The user must therefore very specifically require this operating mode and then start it themselves. This avoids unwanted operating settings and ensures more energy-efficient operation.

Provision can also be made for the first operating mode to be started automatically when the cooktop is switched on. In particular provision is made for a first cooking sub-zone to be able to be heated by at least two heating units disposed adjacent to one another and for the two heating units to be able to be supplied with electrical energy with a first driver circuit. A second cooking sub-zone is heated by at least a third heating unit disposed adjacent to the two heating units of the first cooking sub-zone and at least the third heating unit is supplied with energy with a separate second driver circuit. Preferably the second cooking sub-zone also has at least two heating units which can be supplied with energy by the second driver circuit. In such an embodiment each cooking sub-zone thus has at least two secondary zones, a secondary zone being able to be heated by an assigned heating unit.

Provision can preferably be made in a second operating mode of the cooktop for the cooking sub-zones to be operated independently of one another as a separate cooking zone in each instance. In this second operating mode the first cooking sub-zone can thus be switched on and off independently of the second cooking sub-zone. The individual cooking sub-zones can then also be supplied with different powers in this second operating mode. They can also be switched on and off separately in an independent manner by a user in this second operating mode.

In respect of the formulation of the ability of a cooking zone to be heated with an inductor, it should be noted that this covers the fact that the electromagnetic interaction of a coil of the inductor with a suitable metallic material of a food preparation vessel produces corresponding heating of the food preparation vessel. Precisely this specific physical basis is also covered in the context of the invention by the formulation of the ability of a cooking zone or a surface thereof or a cooking sub-zone to be heated with an inductor.

In addition the formulation of an adjacent arrangement of the inductors refers to a type of positioning, in which the inductors are positioned alongside one another. Thus this is to be understood as an arrangement in which the surfaces formed by the inductors on the cooktop plate disposed above are disposed adjacent to one another and do not partly overlap or even one surface is completely enclosed by the other. This would be the case with inductors configured with a different radius which are disposed radially within one another, which is not intended to be covered here.

The inventive embodiment of a cooktop, particularly an induction cooktop, is designed so that the cooktop has at least one cooking zone which is constructed from at least two cooking sub-zones. Each cooking sub-zone is able to be heated by at least one heating unit, with the heating units only being disposed adjacent to one another without overlapping such that a cohesive heated surface is formed during joint operation of the cooking sub-zones. The cooktop has a control unit, by means of which the cooking sub-zones are able to be operated as a single cooking zone in a first operating mode. The cooktop additionally comprises an apparatus for detecting occupancy of the cooking sub-zone by at least one food preparation vessel, with detection of the occupancy of a cooking sub-zone being able to be performed in the first operating mode. The heating units, the assigned cooking sub-zones of which are occupied by a food preparation vessel, can only be supplied with the same electrical power in each instance in this first operating mode.

In respect of an induction cooktop, in which a heating unit comprises an inductor, this means that all inductors are excited with the same frequency and thus output the same power. This does not necessarily mean however that the same power converted into heat also arrives at the food in a food preparation vessel. This is on account of the fact that, because of the materials and embodiments of food preparation vessels, the supplied power is not converted in the same proportions into heat in all food preparation vessels. An embodiment in which, in this first operating mode, all activated cooking sub-zones are supplied with the same electrical power, allows as regular heating of a single food preparation vessel as possible to be achieved on the cooking sub-zones.

A preferred induction cooktop comprises a circuit arrangement for operating a cooking zone of the induction cooktop. The circuit arrangement comprises a parallel circuit in which two inductors are connected in a parallel manner. Connected in series to the parallel circuit is a current measuring element. The induction cooktop also comprises an apparatus for detecting the occupancy of at least one cooking sub-zone of the overall cooking zone by a food preparation vessel. This apparatus for occupancy detection comprises the current measuring element. This type of embodiment of the induction cooktop on the one hand enables more energy-efficient operation. In particular this type of embodiment makes possible a simplified circuit design with reduced numbers of components, since for the majority of inductors only one single current measuring element is required to enable occupancy of the cooking sub-zone, which is able to be heated with the respective inductors, to be detected. This also makes possible a quite specific mode of operation for pot occupancy detection.

Advantageous embodiments of the inventive method are to be seen as advantageous embodiments of the inventive cooktop.

Further features of the invention will emerge from the claims, the figures and the description of the figures. The features and combinations of features mentioned above in the description and also the features and combinations of features cited subsequently in the description of the figures and/or simply shown in the figures are able to be used not just in the respectively cited combination but also in other combinations or on their own, without departing from the framework of the invention.

BRIEF DESCRIPTION OF THE DRAWINGS

Exemplary embodiments of the invention are explained in greater detail below with reference to schematic drawings, in which.

DETAILED DESCRIPTION OF EXEMPLARY EMBODIMENTS OF THE PRESENT INVENTION

Figure 1:
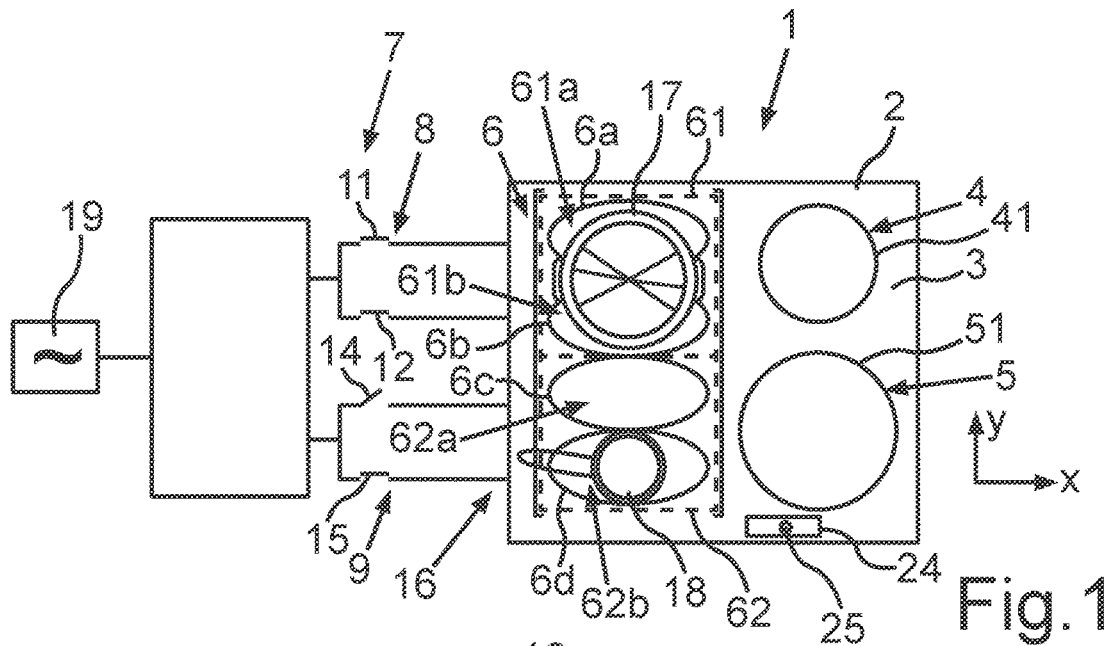
FIG. 1 shows a schematic overhead view of an exemplary embodiment of an inventive cooktop.

Elements which are the same or which function in the same way are provided with the same reference characters in the figures.

FIG. 1 shows a schematic diagram of an overhead view of a cooktop 1 having a support plate 2, which can be configured from glass or glass ceramic. Food preparation vessels, such as pans, pots or the like, can be placed on an upper face 3 of the support plate 2. In the exemplary embodiment the cooktop 1 comprises three cooking zones 4, 5 and 6, which differ in respect of their surface dimensions and their surface shape. Thus the cooking zones 4 and 5 are configured as circular in shape and have different radii. Their maximum surface size is indicated by means of the contours 41 and 51 of the cooking zones 4 and 5, with a user thus being able to identify where a heating element is located for the cooking zones 4 and 5 below the support plate 2 in these positions.

In the exemplary embodiment the cooktop 1 is configured as an induction cooktop, so that at least one inductor is configured below the cooking zones 4 and 5 in each instance. Provision is made in the exemplary embodiment for each of said inductors to have a single coil which is accordingly wound in the shape of a circle so that, on activation of the induction coil essentially the entire surface of the cooking zone 4 which is delimited by the contour 41 is able to be heated, and in respect of the cooking zone 5 which is delimited by the contour 51, this is likewise able to be heated by an induction coil. As can be seen from the diagram according to FIG. 1, the cooking zones cooking zones 4 and 5 are disposed spaced apart from one another, whereby they are also disposed spaced apart from the cooking zone 6.

In the exemplary embodiment the cooktop 1 is configured as an induction cooktop, so that at least one inductor is configured below the cooking zones 4 and 5 in each instance. Provision is made in the exemplary embodiment for each of said inductors to have a single coil which is accordingly wound in the shape of a circle so that, on activation of the induction coil essentially the entire surface of the cooking zone 4 which is delimited by the contour 41 is able to be heated, and in respect of the cooking zone 5 which is delimited by the contour 51, this is likewise able to be heated by an induction coil. As can be seen from the diagram according to FIG. 1, the cooking zones cooking zones 4 and 5 are disposed spaced apart from one another, whereby they are also disposed spaced apart from the cooking zone 6.

In addition the cooking zone 6 is configured as a particularly large cooking zone surface which in addition is also configured as rectangular in respect of its shape. In the embodiment shown the cooking zone 6 comprises four inductors disposed below the support plate 2, of which each inductor has a single induction coil. In respect of shape, these are disposed adjacent to one another and have an oval shape, as shown in FIG. 1. The inductors adjoin one another so that the heatable surface can be heated almost completely. The oval shape of the wound induction coils of the individual inductors 6a, 6b, 6c and 6d configured as heating units makes particularly regular surface heating possible. As can be seen, these inductors 6a to 6d with their induction coils are not disposed cascaded within one another but are adjacent to one another and all have the same geometrical dimensions.

In addition the cooktop 1 comprises an apparatus 16 for detecting a food preparation vessel on the cooking zones 4, 5 and 6. This is particularly to be seen in respect of the detection of a food preparation vessel on cooking zone 6 which is very large as regards its surface and is larger than the surfaces of cooking zones 4 and 5 together.

In particular the surface of the cooking zone 6 essentially extends over at least 80%, preferably at least 90% of the depth of the cooktop 1 and thus also of the support plate 2, meaning an extension in the y-direction. In addition the cooking zone 6 has a surface in the width (x-direction), which in the exemplary embodiment comprises at least 30%, preferably 40% of the overall widthways extension of the support plate 2.

The apparatus 16 preferably comprises a number of sensors which are configured to operate capacitively or inductively, so that occupancy can be detected reliably.

The cooktop 1 also comprises a circuit arrangement 7, which is configured to supply energy to the individual heating units of the cooking zones 4 to 6 and comprises the inductors 6a to 6d. The circuit arrangement in this context comprises a first driver circuit 8 and a second driver circuit 9 separate therefrom. The first driver circuit 8 is configured to supply energy to the two first heating units or inductors 6a and 6b. In addition the second driver circuit 9 is configured to supply energy to the two further heating units or inductors 6c and 6d. The two driver circuits 8 and 9 are able to be operated independently of one another.

In addition the cooktop 1 comprises a control unit which is assigned in a component-specific and functional manner to the circuit arrangement 7. By means of the control unit the individual inductors 6a to 6d are individually controlled and accordingly activated and deactivated and the signals of the apparatus 16 can be processed accordingly with this control unit.

Figure 2:
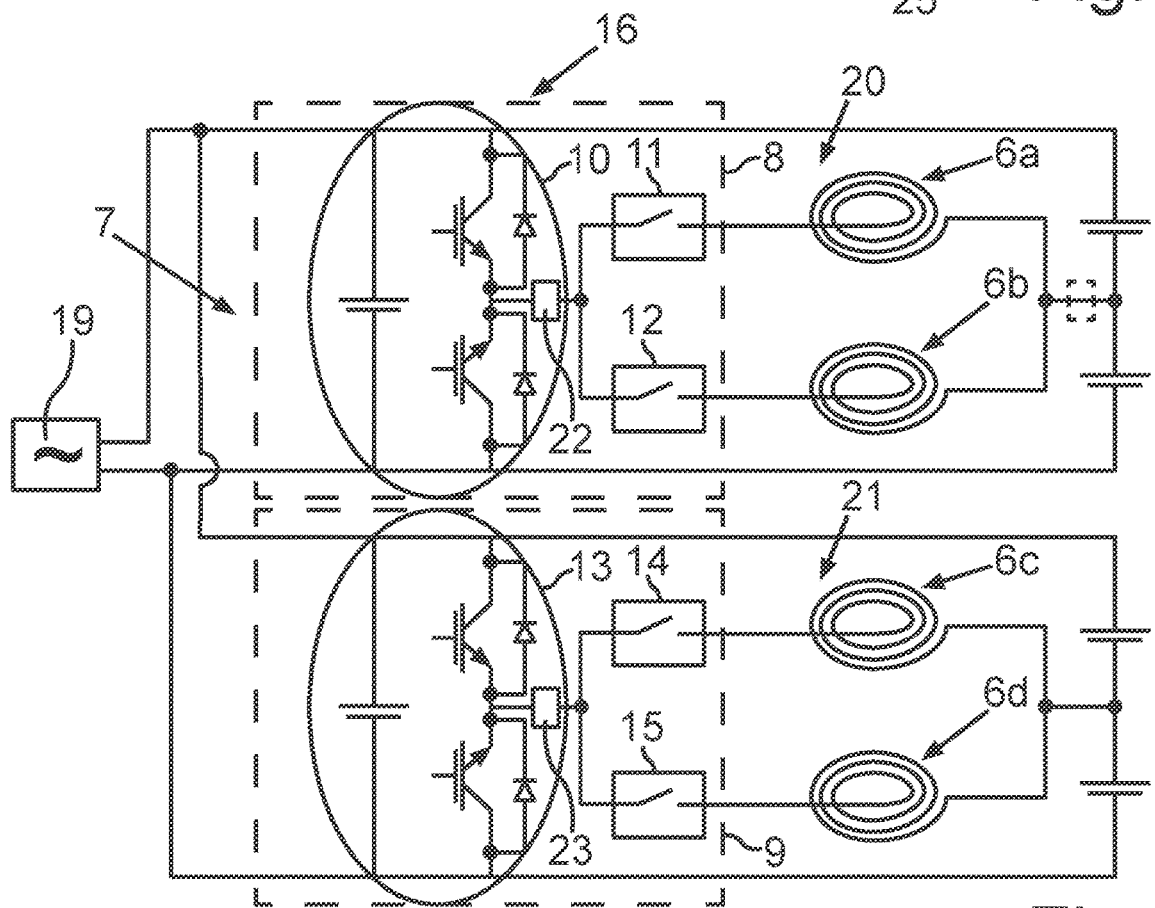
FIG. 2 shows a schematic simplified view of a circuit principle of the cooktop according to FIG. 1.

In respect of the specific structure of the circuit arrangement 7, reference is made to the simplified circuit diagram in FIG. 2. AC voltage for the circuit arrangement 7 is supplied via a power supply network 19. The first driver circuit 8 comprises a first half bridge circuit 10 which is connected in series to a parallel circuit 20. The parallel circuit 20 comprises a first circuit branch, in which a first relay 11 is connected in series to the induction coil of the inductor 6a and thus the first heating unit. A relay 12 is also connected in the second circuit branch parallel thereto, being connected in series to the induction coil of the second inductor 6b or the second heating unit.

In addition the second driver circuit 9 is constructed in a similar way to the first driver circuit 8 and likewise comprises a half bridge circuit 13, which is connected in series to a parallel circuit. This parallel circuit here too comprises a first circuit branch, in which a relay 14 is connected in series to an induction coil of the third inductor 6c or the third heating unit. In a second circuit branch a further relay 15 is connected in series to an induction coil of the fourth inductor 6d or the fourth heating unit. These secondary zones 61a and 61b essentially represent in terms of surface the size of the oval embodiments of the induction coils disposed thereunder, which are identified by the corresponding contours on the upper face 3 of the support plate 2.

In addition the second driver circuit 9 is constructed in a similar way to the first driver circuit 8 and likewise comprises a half bridge circuit 13, which is connected in series to a parallel circuit 21. This parallel circuit 21 here too comprises a first circuit branch, in which a relay 14 is connected in series to an induction coil of the third inductor 6c or the third heating unit. In a second circuit branch a further relay 15 is connected in series to an induction coil of the fourth inductor 6d or the fourth heating unit.

Connected in series to the parallel circuit 20 is a current measuring element 22. A circuit design is thus realized in which only one such current measuring element 22 is present in the first driver circuit 8, which is not connected in the parallel circuit 20 itself but in series to the parallel circuit 20. This enables an embodiment with a very much reduced number of components to be created. The current measuring element 22 is also assigned in a component-specific manner to the apparatus 16 for pot detection or for occupancy detection of the cooking zone. In a similar manner the second driver circuit 9 likewise has a current measuring element 23, which is connected in series to the parallel circuit 21.

In the exemplary embodiment the current measuring elements 22 and 23 of the separate driver circuits 8 and 9 are connected between the half bridge circuits 10 or 13 and the parallel circuits 20 or 21 respectively.

As indicated in the diagram according to FIG. 2, the current measuring element 22 could also be connected after the parallel circuit 20 in series to the parallel circuit 20, as symbolized by the dashed-line box. Similarly there could be provision for connection of the current measuring element 23 after the parallel circuit 21 and in series therewith.

According to the diagram shown in FIG. 1, in the exemplary embodiment the induction cooktop 1 also comprises an operating facility 24 which is configured on the cooktop plate or support plate 2.

This operating facility 24 can be configured at least partly as touch-sensitive. It can have a number of operating elements and in addition also include a display unit. In particular the operating facility 24 has an operating element 25 which can likewise be configured to be touch-sensitive. A user-defined activation of an occupancy detection check of the overall cooking zone 6 can be performed with this operating element 25.

As already explained at the outset, the large-surface cooking zone 6 is formed from a number of cooking sub-zones. In the exemplary embodiment two cooking sub-zones 61 and 62 are provided for this purpose, their corresponding zone surfaces being identified. These are configured as cohesive and directly adjoining one another. In the exemplary embodiment each of these cooking sub-zones 61 and 62 has two secondary zones 61a and 61b and also 62a and 62b. The surfaces of the secondary zones are so to speak defined as regards their dimensions by the coils of the inductors 6a to 6d wound in an oval shape or by their size.

In respect of the immediately adjacent arrangement of the cooking sub-zones 61 and 62 and also the secondary zones 61a, 61b, 62a and 62b, this is to be provided according to the diagram so that the surfaces delimited by the respective contours are disposed adjacent to one another without overlapping.

The induction cooktop 1 is configured so that at least the cooking zone 6 can be operated in two different operating modes. Provision is thus made in a first operating mode for the two cooking sub-zones 61 and 62, which form the overall cooking zone 6, to be operated together and thus to form the overall cooking surface of the cooking zone 6. In this first operating mode provision is made particularly for all cooking sub-zones 61 and 62 and particularly also the secondary zones 61a, 61b, 62a and 62b to be supplied with the same electrical power. This relates during operation to the cooking sub-zones 61 and 62 or the formed secondary zones 61a, 61b, 62a and 62b occupied by a food preparation vessel 17 or 18. Provision is thus made for the inductors 6a to 6b assigned locationally and functionally in each instance to the secondary zones 61a, 61b, 62a and 62b only to be able to be supplied with the same power when this first operating mode is activated. This means that those inductors 6a to 6d, their assigned secondary zones 61a, 61b, 62a and 62b or the corresponding cooking sub-zones 61 and 62 on the support plate 2, which are occupied by a food preparation vessel 17 or 18, can only be supplied with the same electrical power.

In this first operating mode an occupancy detection check is performed by means of the apparatus 16, as explained later. Provision is made in the exemplary embodiment, on activation of the cooktop 1 and with a user-defined or automatically-started first operating mode of the cooking zone 6, for a first occupancy detection check to be performed automatically. If a food preparation vessel 17 or 18 is then detected at specific points, the inductors 6a to 6d occupied accordingly over the secondary zones 61a, 61b, 62a, and 62b are activated. If a further occupancy check is then also subsequently required or to be performed, this can only be started in a user-defined manner. To this end the user must actuate the operating element 25. An automatic second occupancy detection check and thus starting a second occupancy detection phase automatically is therefore not possible.

The cooking zone 6 is additionally able to be operated in its second operating mode, in that the cooking sub-zones 61 and 62 are able to be switched on and off independently of one another. In this second operating mode the cooking sub-zones 61 and 62 can also be operated independently of one another with different powers. In this second operating mode an overall cooking zone 6 does not exist so to speak and the cooking sub-zones 61 and 62 are to be seen as separate independent cooking zones, similar to the further cooking zones 4 and 5.

In respect of the procedure for operation of the cooktop 1 and in particular of the large-surface cooking zone 6, a multistage search method is performed in a method-specific manner in respect of occupancy detection in said first operating mode. For this purpose it is checked in a first step whether any food preparation vessel is disposed on the overall cooking zone 6, with only a superordinate search for occupancy being performed in this first search step and not a locationally specific search.

The cooking sub-zones 61 and 62 with their correspondingly indicated zone surfaces are formed in respect of number and size preferably as a function of the number of driver circuits 8 and 9. In the exemplary embodiment the first cooking sub-zone 61 is thus formed such that it represents around half of the overall cooking zone surface of the cooking zone 6 and in particular comprises the surfaces of the regions of the cooking zone 6, which can be heated with the first two inductors 6a and 6b. In a similar way the second cooking sub-zone 62 is formed so that it comprises the surface of the cooking zone 6, which can be heated by the further inductors 6c and 6d.

According to the first search step a check is thus initially made in a broad and superordinate search strategy for general occupancy of the cooking zone 6. In respect of this detection, low-voltage measurement signals are generated by the apparatus 16, which produce an oscillation in one of the series resonant circuits formed by the inductors 6a to 6d and the capacitors shown in the diagram. In this first search step all switching elements in the form of the relays 11 to 15 are closed. Correspondingly occurring current values are then detected by the current measuring elements 22 and 23, it being possible to detect from the current values whether at least one food preparation vessel is located somewhere on the cooking zone 6.

If it is established in this first step that at least one food preparation vessel is located on the cooking zone 6, then in a further subsequent search step a locationally precise search is performed to determine where the food preparation vessel is located exactly.

As a result of the circuit design shown in FIG. 2, in which only one current measuring element 22 or 23 is assigned in each instance to one of the driver circuits 8 and 9 and these are connected in a specific manner in series to the parallel circuits 20 or 21, a further search strategy is to be performed in this regard in a specific way.

To this end provision is then initially made for the relay 11 and the relay 14 to remain closed, while the relay 12 and the relay 15 are opened. Through this mode of operation it can be detected by way of the current measuring elements 22 and 23 whether a food preparation vessel is disposed above the inductor 6a and the inductor 6c and the corresponding secondary zone 61a or 62a is occupied.

In a further search step the relays 11 and 14 are then opened and the relays 12 and 15 closed. From the current values then likewise detected again by way of the current measuring elements 22 and 23, it can also be identified here whether food preparation vessels are located above the secondary zones 61b and 62b.

Provision can naturally also be made for the relays 11 and 14 to be initially opened and the relays 12 and 15 to remain closed and subsequently for the relays 11 and 14 then to be closed and the relays 12 and 15 opened.

As a function of these further search steps performed, it is then established at precisely which locationally specific positions of the overall cooking zone 6 a food preparation vessel is actually located.

Subsequently only the inductor 6a to 6b, of which the assigned secondary zone 61a, 61b, 62a or 62b is also specifically occupied by a food preparation vessel, is supplied with electrical energy by closing the relay 11 to 15 connected in series thereto.

The remaining inductors, of which the associated secondary zones are not occupied, are or remain deactivated.

Such an occupancy detection phase lasts about 5 seconds in the exemplary embodiment. During this period food preparation vessels 17 and 18 can be removed or placed on the cooktop and this is then also detected. If an occupancy detection phase has elapsed and correspondingly ended, then the additional placing of a food preparation vessel on the cooking zone 6 will not be detected and this further food preparation vessel will then also not be heated. Only if the user actively actuates the operating element 25 is a further occupancy detection check started and the food preparation vessel additionally placed on the cooktop after the first occupancy detection phase then detected.

It should also be mentioned that a food preparation vessel detected during an occupancy detection phase on the cooking zone in 6 in this first operating mode can be displaced on the cooking zone 6 (but not removed) after the occupancy detection phase has elapsed and this displacement will be detected. Those inductors 6a to 6d are then activated which are required to heat up the food preparation vessel at the new location, with those inductors 6a to 6d, which are now not occupied by comparison with the original position of the food preparation vessel before it was displaced, being deactivated.

In the diagram shown by way of example in FIG. 1 two food preparation vessels 17 and 18 are shown, which in terms of size are each smaller than a cooking sub-zone 61 or 62. The first operating mode of the cooktop 1 is particularly advantageous when a food preparation vessel is placed on the cooking zone 6, which is larger in terms of the surface that it covers than a cooking sub-zone 61 or 62. This is when this first operating mode is particularly advantageous since in the second operating mode overall heating of such a large food preparation vessel is so to speak not possible.

The secondary zones 61a, 61b, 62a and 62b shown by way of example are the same size in terms of surface and also identical in terms of their shape in the exemplary embodiment. Provision can also be made for at least one secondary zone to be configured as larger and/or with a different shape. This also depends particularly on the embodiment and size of the assigned inductor 6a to 6d disposed below.

The explanation of the multistage search method set out above can also be used for the specific exemplary embodiment shown in FIG. 2 such that after the broad and basic first detection of a food preparation vessel somewhere on the cooking zone 6, the subsequent search steps in the sub-regions relating to the cooking sub-zone 61 and the cooking sub-zone 62 are not carried out simultaneously, as explained above, but offset in time.

In respect of the exemplary diagram shown in FIG. 1 the relay 13 is opened, since no food preparation vessel is placed on the secondary zone 62a. The further secondary zones 61a, 61b and 62b are occupied by the food preparation vessels 17 and 18, so that the assigned inductors 6a, 6b and 6d disposed below them and thus below the cooktop plate or support plate 2 must be supplied with energy, to which end the relays 11, 12 and 15 are closed.

What is claimed is:

1. A method for operating a cooking zone of a cooktop, with the cooking zone being formed from at least two cooking sub-zones and each cooking sub-zone being heatable by at least one heating unit, wherein the heating unit of one cooking sub-zone and the heating unit of another cooking sub-zone are disposed adjacent to one another without overlapping, such that a cohesive heatable surface is formed during joint operation of the cooking sub-zones, said method comprising:
    activating detection of an occupancy of a cooking sub-zone by at least one food preparation vessel in a first operating mode when the cooking sub-zones can be operated as a joint cooking zone; and
    supplying a same electrical power to all activated cooking sub-zones occupied by a food preparation vessel,
    wherein in the first operating mode the cooking sub-zones not occupied by a food preparation vessel are deactivated and remain deactivated, even in the presence of a food preparation vessel placed on the deactivated cooking sub-zones after expiration of an initial occupancy detection phase, until reactivation of a subsequent occupancy detection phase that is initiated by a user, and
    the subsequent occupancy detection phase can only be initiated by the user.

2. The method of claim 1, further comprising operating each of the cooking sub-zones independently of one another as a separate cooking zone in a second operating mode of the cooktop.

3. The method of claim 1, wherein the initial occupancy detection phase is started in a user-defined manner in the first operating mode.

4. The method of claim 1, wherein a selection of the first operating mode involves an automatic starting of the initial occupancy detection phase and heating of only a cooking sub-zone, on which a food preparation vessel is detected.

5. The method of claim 1, wherein, after the end of detection of an occupancy, placement of a further food preparation vessel on the cooking zone remains undetected in the first operating mode and the cooking sub-zone, on which the further food preparation vessel is placed remains unheated.

6. The method of claim 1, wherein during detection of an occupancy, removal and placement of one or more food preparation vessels on the cooking sub-zones of the cooking zone is detected and the cooking sub-zones, on which occupancy is detected, are heated.

7. The method of claim 1, wherein an occupancy detection phase lasts less than 10 seconds.

8. The method of claim 1, wherein an occupancy detection phase lasts for 5 seconds.

9. The method of claim 4, wherein at least in the initial occupancy detection phase, all cooking sub-zones are checked in respect of whether they are occupied or not.

10. The method of claim 4, wherein in all occupancy detection phases, all cooking sub-zones are checked in respect of whether they are occupied or not.

11. The method of claim 1, wherein in the first operating mode, a displacement of a food preparation vessel detected during an occupancy detection phase on the cooking zone is also detected after an occupancy detection phase has elapsed and the cooking sub-zones, to which the food preparation vessel is displaced, are then heated.

12. The method of claim 1, wherein the first operating mode is configured to allow starting only in a user-defined manner.

13. The method of claim 1, wherein the first operating mode is started automatically when the cooktop is switched on.

14. The method of claim 1, wherein a first cooking sub-zone is heatable by at least two heating units disposed adjacent to one another and the two heating units are supplied with electrical energy with a first driver circuit, and a second cooking sub-zone is heatable by at least a third heating unit disposed adjacent to the two heating units of the first cooking sub-zone and the at least third heating unit is supplied with energy with a separate second driver circuit.

* * * * *